(12) United States Patent
Frink et al.

(10) Patent No.: US 6,407,775 B1
(45) Date of Patent: Jun. 18, 2002

(54) IMAGE RESIZER AND FRAME RATE CONVERTER WITH PULLDOWN CONTROLLER

(75) Inventors: Craig R. Frink, Chelmsford; Raymond D. Cacciatore, Westford, both of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/293,332

(22) Filed: Apr. 16, 1999

(51) Int. Cl.[7] ............................ H04N 7/01; H04N 11/20
(52) U.S. Cl. ........................ 348/443; 348/445; 348/459
(58) Field of Search .................................. 348/443, 581, 348/561, 556, 445, 458, 441; 345/660, 667, 668, 669, 670, 671; H04N 7/01, 11/20

(56) References Cited

U.S. PATENT DOCUMENTS

| | | | |
|---|---|---|---|
| 5,500,678 A | | 3/1996 | Puri |
| 5,754,248 A | * | 5/1998 | Faroudja .................... 348/441 |
| 5,796,442 A | * | 8/1998 | Gove et al. ................. 348/556 |
| 5,999,220 A | * | 12/1999 | Washino .................... 348/441 |
| 6,072,531 A | * | 6/2000 | Shibano ..................... 348/448 |
| 6,151,074 A | * | 11/2000 | Werner ...................... 348/443 |
| 6,151,075 A | * | 11/2000 | Shin et al. ................. 348/441 |
| 6,256,069 B1 | * | 7/2001 | Rosen et al. ............... 348/448 |

FOREIGN PATENT DOCUMENTS

| | | |
|---|---|---|
| WO | WO9515659 | 6/1995 |
| WO | WO9739586 | 10/1997 |
| WO | WO9846016 | 10/1998 |

OTHER PUBLICATIONS

John Amanatides and Don P. Mitchell "Antialiasing of Interlaced Video Animation" AT&T Bell Labs, Computer Graphics vol. 24, No. 4, Aug. 1990.

* cited by examiner

*Primary Examiner*—Michael H. Lee
(74) *Attorney, Agent, or Firm*—Peter J. Gordon

(57) ABSTRACT

Film frames, or other images in which fields are captured at the same point in time, may be processed as a sequence of temporally coherent image fields or as progressive images. Such images may be obtained, for example, by digitizing signals from a telecine and dropping redundant fields inserted by the telecine. These fields may be stored in a buffer. Two fields of a given frame are read from the buffer by a resizer in accordance with read instructions, which may be determined according to any specified pulldown sequence, an output image size, and resize instructions, such as pan and scan or letterbox instructions. The resizer also may be informed of the input image size if it is not presumed. Thus, the full input image from which an output image may be generated is used by the resizer to generate output image. The resizer uses data in the input image received at one rate to generate one output image at the output rate. The resize instructions, if varied over time, are determined for each output image at the output image rate. For example, if a pan and scan operation is specified to move from a first position to a second position over two input images, the position of the sampled area may be determined by interpolating between the first and second positions and sampling along the interpolated curve for each output image. Thus, the sampled area of the input image is different for each output field. Because changes in position of the sampled area are made in increments at the temporal resolution and ordering of the output images, artifacts in the output images are reduced.

9 Claims, 10 Drawing Sheets

IMAGE RESIZER AND FRAME RATE CONVERTER WITH PULLDOWN CONTROLLER

BACKGROUND

Images captured on film commonly are optically compressed in the horizontal direction through the use of anamorphic lenses. When the film is played back using a film projector, the compression is optically reversed to restore the proper aspect ratio to the captured images. This process of optical horizontal compression and decompression allows the capture of a wide screen image on standard 35 millimeter or 70 millimeter film.

Sometimes film is transformed into images in a video signal or a sequence of digital still images for display on electronic displays, such as television monitors or computer monitors. Such images generally have one of two formats: progressive or interlaced. Progressive images are defined by a series of scan lines that generally are displayed at approximately the same time. In interlaced images, these scan lines are grouped into sets of odd lines and even lines that are displayed in an alternating manner. Television signals commonly are captured in an interlaced format. Images that are electronically displayed also typically have a different image rate from film. Rate conversion is accomplished through a process called pulldown and/or the use of an interlaced image format. If an anamorphic image is displayed on an electronic display, if no processing steps are taken the image remains horizontally compressed. To display anamorphic images in a proper aspect ratio on an electronic display, several processes generally are used to resize images. Example resizing operations include "pan and scan," "zoom," "tilt," "squeeze," or "letterboxing."

Pan and scan involves selecting an area of each image. The size of the selected area is chosen to account for the horizontal compression of the original image and the size of the image to be displayed. The selected area generally moves horizontally from image to image. The selected area is resized horizontally, and sometimes vertically, to fill the display. Pan and scan may involve either expansion or reduction of the size of the image. Tilt, sometimes referred to as pan and tilt, also involves selecting an area of an image, but the area generally moves vertically from image to image. Zoom generally involves selecting any area of an image and expanding or reducing it in size. Letterboxing involves resizing an anamorphic image, i.e., by reducing its size vertically, to restore the proper aspect ratio to the image, resulting in blank, e.g., black, areas in the display above and below the displayed image. Squeeze is a similar to letterboxing, but is a horizontal reduction or expansion in which blank areas may appear to the left and/or right of the image.

Reduction or expansion of an image vertically generally involves averaging or filtering two or more adjacent lines in order to produce a different number of lines. Similarly, reduction or expansion of an image horizontally generally involves averaging or filtering two or more adjacent pixels in a line to produce a different number of pixels.

If a field of an interlaced image is resized, because each field has only either even lines or odd lines, the lines next to each other in the field are not next to each other in the image frame. Therefore, resizing causes information from non-adjacent lines to be combined, resulting in errors in the resized image. If two fields of an image that was originally captured in an interlaced format are combined to form a full frame before resizing, an object in the image may be moving between two fields, resulting in a different kind of error in the resized image.

Images on film may be transferred to an interlaced signal format, digitized and recombined to create a progressive image without errors. Resizing of the progressive image avoids errors otherwise associated with resizing interlaced images. However, pan and scan or pan and tilt operations tend to have errors similar to twitter or judder if the resized progressive images are subsequently converted to interlaced images with pulldown. If resizing and pulldown are both performed on fields of interlaced images, in the time domain of the interlaced signal, pan and scan motion is optimized, but resizing of the fields introduces artifacts.

SUMMARY

To minimize errors, pan and scan, letterboxing or other resizing operations are performed on progressive scan images or temporally coherent fields, with the resizing parameters defined at the image rate of the output images. In particular, changes in the area of an image that is selected are made in increments that match the temporal resolution and ordering of the output images. Thus, if a resizing operation outputs images according to a specified sequence, errors in the output images are reduced, particularly if the output images are interlaced and result from application of a pulldown sequence. Although the resize and pulldown operations may be considered to occur in separate time domains, the resizing and pull-down operations may be performed simultaneously.

In one embodiment, temporally coherent interlaced images, e.g., created by scanning film, are stored in a memory at a first rate, e.g., 48 fields per second. Output images are generated at the rate of the electronic display, e.g., 59.97 or 50 fields per second, following any pull-down sequence or other specified image ordering. For each output image to be generated, lines from both fields of a frame are read from memory. Therefore, all of the data from a frame is available to produce a high quality resized image from which the output image may be generated. Because all of the lines of the input image are available to the resizer, a simple interpolation filter can be used to perform the resizing operation and produce high quality output images.

The technique may be used in many applications. Example applications include converting images digitized from film to a format suitable for display on either NTSC or PAL standard monitors. Additional applications include, but are not limited to, conversion of PAL video to NTSC video, conversion of non-interlaced digital television formats to interlaced formats, and conversion between high definition television and other digital television formats.

Accordingly, an apparatus, or method or computer program product for resizing images receives pixel data of a sequence of input images having a first temporal resolution. Each of the received input images is resized to produce an output image using both odd and even lines from the input image. A sequence of the output images is provided at a second temporal resolution. The input images may be defined by temporally coherent interlaced fields or progressive scan images. The second temporal resolution may be different from the first temporal resolution. Resizing may use an area within the input image to produce the output image. The position of the area within the input image may vary over time. The position of the area within the input image may be determined at the second temporal resolution.

DETAILED DESCRIPTION

The following detailed description should be read in conjunction with the attached drawing in which similar reference numbers indicate similar structures. All references cited herein are hereby expressly incorporated by reference.

Figure 1:
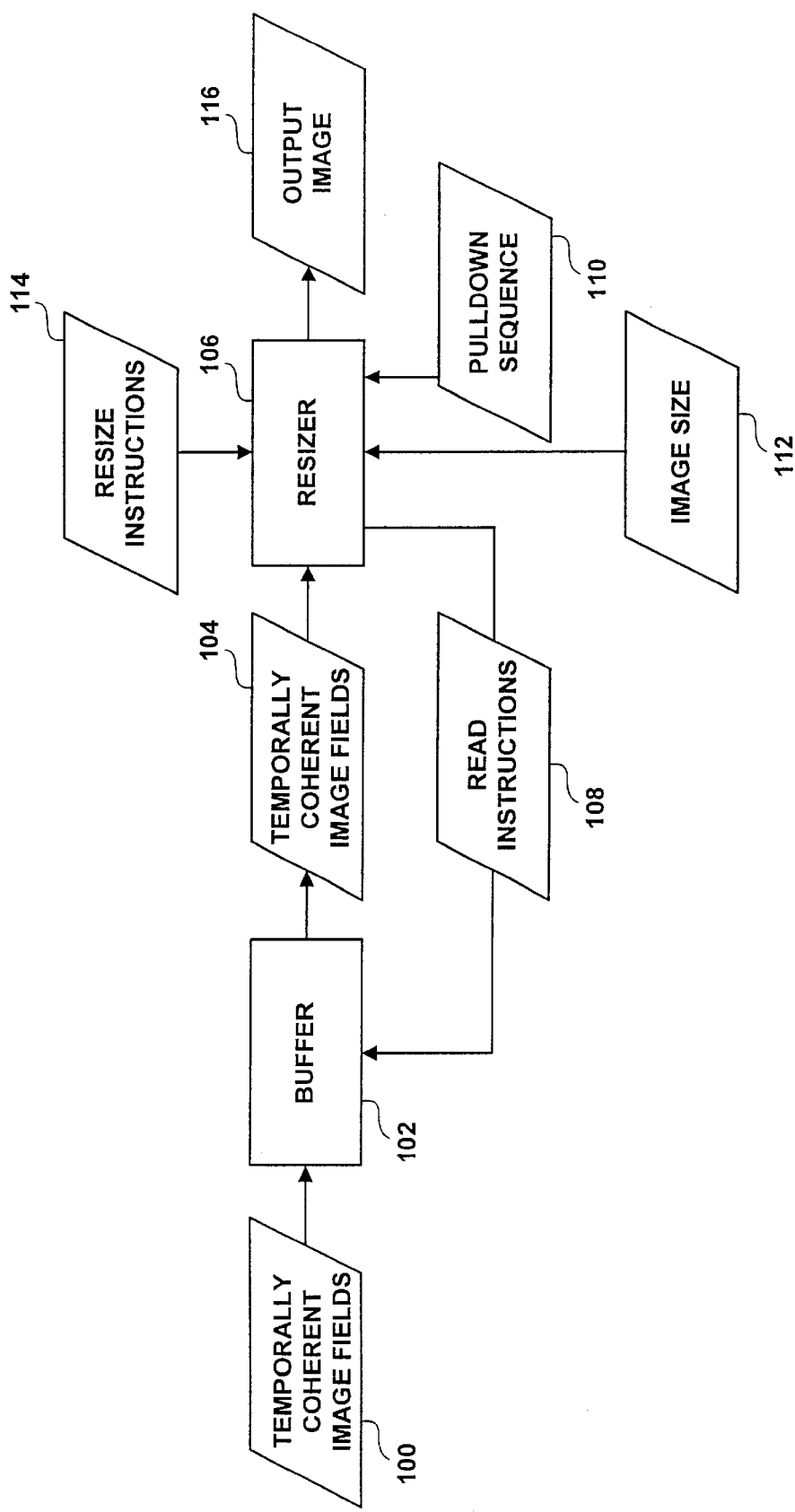
FIG. 1 is a data flow diagram illustrating how resize and pulldown operations may be performed on an input image to produce an output image.

Referring now to FIG. 1, either temporally coherent image fields, which are fields captured at the same point in time, or a progressive scan image may be received and stored in a buffer 102. Two fields of a given frame are read from the buffer by a resizer 106 in accordance with read instructions 108. The read instructions 108 may be determined according to any specified pulldown sequence 110, an output image size 112, and resize instructions 114, such as pan and scan or letterbox instructions. The resizer 106 also may be informed of the input image size. Thus, the full frame from which an output image may be generated is used by the resizer 106 to the extent that the information from the full frame is used to create the output image. The resizer 106 uses two temporally coherent image fields 104, or a progressive image, received at one rate to generate one output image 108 at the output rate. The output rate may be different from the input rate.

The resize instructions 114, if varied over time, are determined for each output image at the rate of the output images. For example, if a pan and scan operation is specified to move from a first position to a second position over two input images at, e.g., twenty-four frames per second, the position of the sampled area may be determined by interpolating between the first and second positions and sampling along the interpolated curve for each output image, which may be five output images, for example, if the output images have the rate of an NTSC television signal. Thus, the sampled area of the input image is different for each output image. Because changes in position of the sampled area are made in increments at the temporal resolution and ordering of the output images, artifacts in the sequence of output images are reduced.

The input image may come from any source that provides temporally coherent image fields or a progressive image. Example sources of such images include scanned film, a television signal output from a telecine that may be digitized, or progressive high definition digital television signal data. The input image may have any temporal resolution or frame rate, and any spatial resolution or image size. The pixel data may have any format, including the color space used to represent each pixel, the pixel depth and the ordering of pixel data.

This input data also may include several formats. For example, a segment of film resolution data may be followed by a segment of television fields.

The output image also may have any temporal resolution or frame rate, and any spatial resolution or image size. The output images may be interlaced or progressive and may have an order defined by a pulldown sequence, such as 3:2 pulldown or 2:3 pulldown.

Figure 2A:
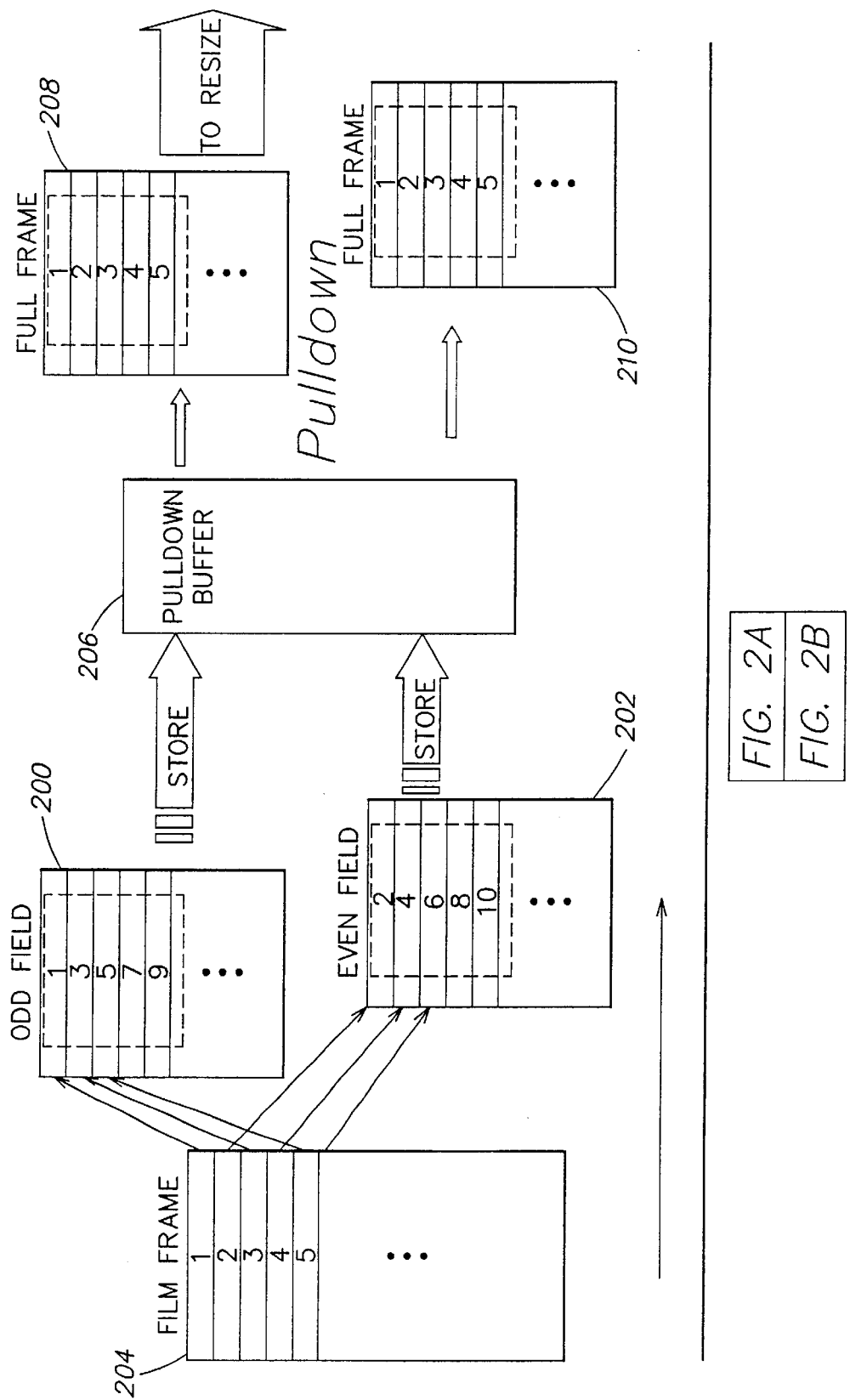
FIG. 2 is an illustration of the pulldown and resize process performed by the system of FIG. 1.
Figure 2B:
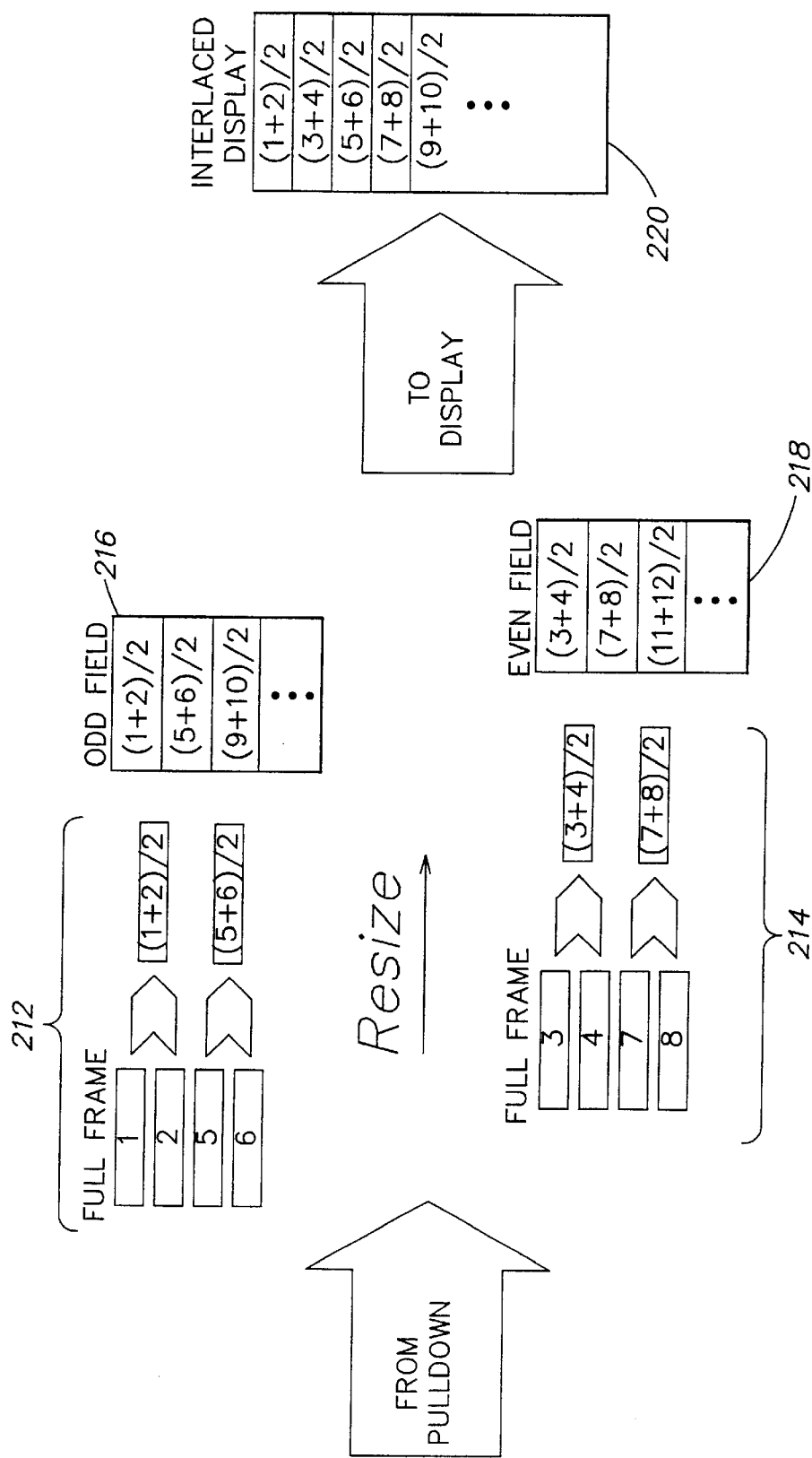

As an example, as shown in FIG. 2, odd and even fields 200 and 202 may be acquired from a film frame 204. These fields may be stored in a pulldown buffer 206, from which the full frame may be read as indicated at 208 and 210. In contrast, conventional telecine processes generally output only odd or even fields from the pulldown buffer. With the full frame of information 208 or 210 available in the pulldown buffer 206, a resize operation may be performed on the full frame as indicated at 212 or 214. Therefore, an odd field or even field, as indicated at 216 or 218, may be generated. When displayed, as indicated at 220, the interlaced image has less error attributable to resizing and pulldown operations.

Figure 3A:
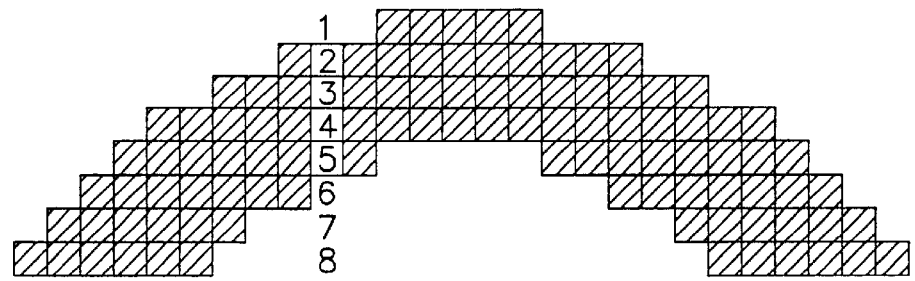
FIGS. 3A, 3B and 3C illustrate the relationship between resized fields, resized frames and an original film frame.
Figure 3B:
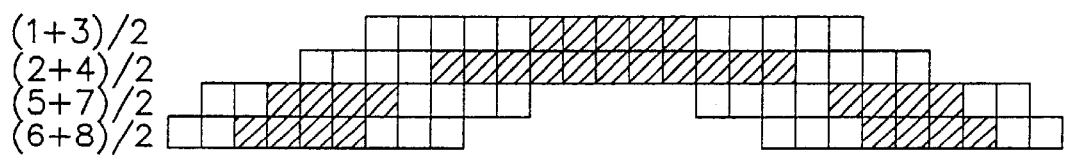
Figure 3C:
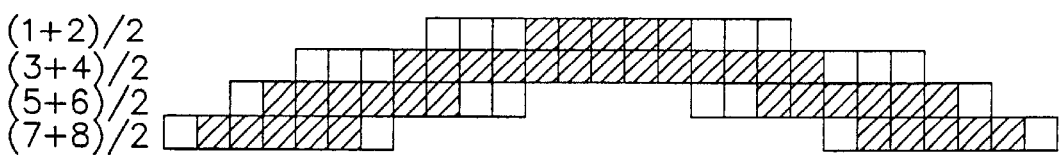

An example is shown in FIGS. 3A, 3B and 3C. FIG. 3A illustrates a portion of an original film frame, as scanned to produce a single digital still image, having lines numbered one through eight. If resizing is performed only on the individual fields, the resulting interlaced image is shown in FIG. 3B. FIG. 3B shows the combination of the odd and even fields as if they were shown at the same time, as in a progressive image. FIG. 3C illustrates an image wherein each of the odd and even fields is generated from the entire image frame. FIG. 3C shows the combination of the odd and even fields as if they were shown at the same time as in a progressive image.

An example circuit for providing the resize and pulldown operation of FIG. 1 will now be described in connection with FIGS. 4 through 10. This circuit is merely an example implementation of the system shown in FIG. 1. The system shown in FIG. 1 also may be implemented, for example, using other circuits or using a computer program executed on a general purpose processor. This example is described in the context of one possible use of the circuit to convert temporally coherent input fields into interlaced output fields with pulldown.

This circuit may be used in a variety of systems which permit editing of video programs. In systems that produce output images that are interlaced, titles may be applied to the output images. Other kinds of effects may be applied to images with temporally coherent input fields. Example systems in which this resizer may be used include International Publication No. WO94/01971, published Jan. 20, 1994, entitled "Electronic Film Editing System Using Both Film and Videotape Format," U.S. patent application Ser. No. 09/054,764, filed Apr. 3, 1998, entitled "A Multi-Stream Switch-Based Video Editing Architecture," and U.S. patent application Ser. No. 09/055,073, filed Apr. 3, 1998, entitled "A Multi Stream Video Editing System Using Uncompressed Video Data for Real-Time Rendering Performance and for Non Real-Time Rendering Acceleration."

Figure 4:
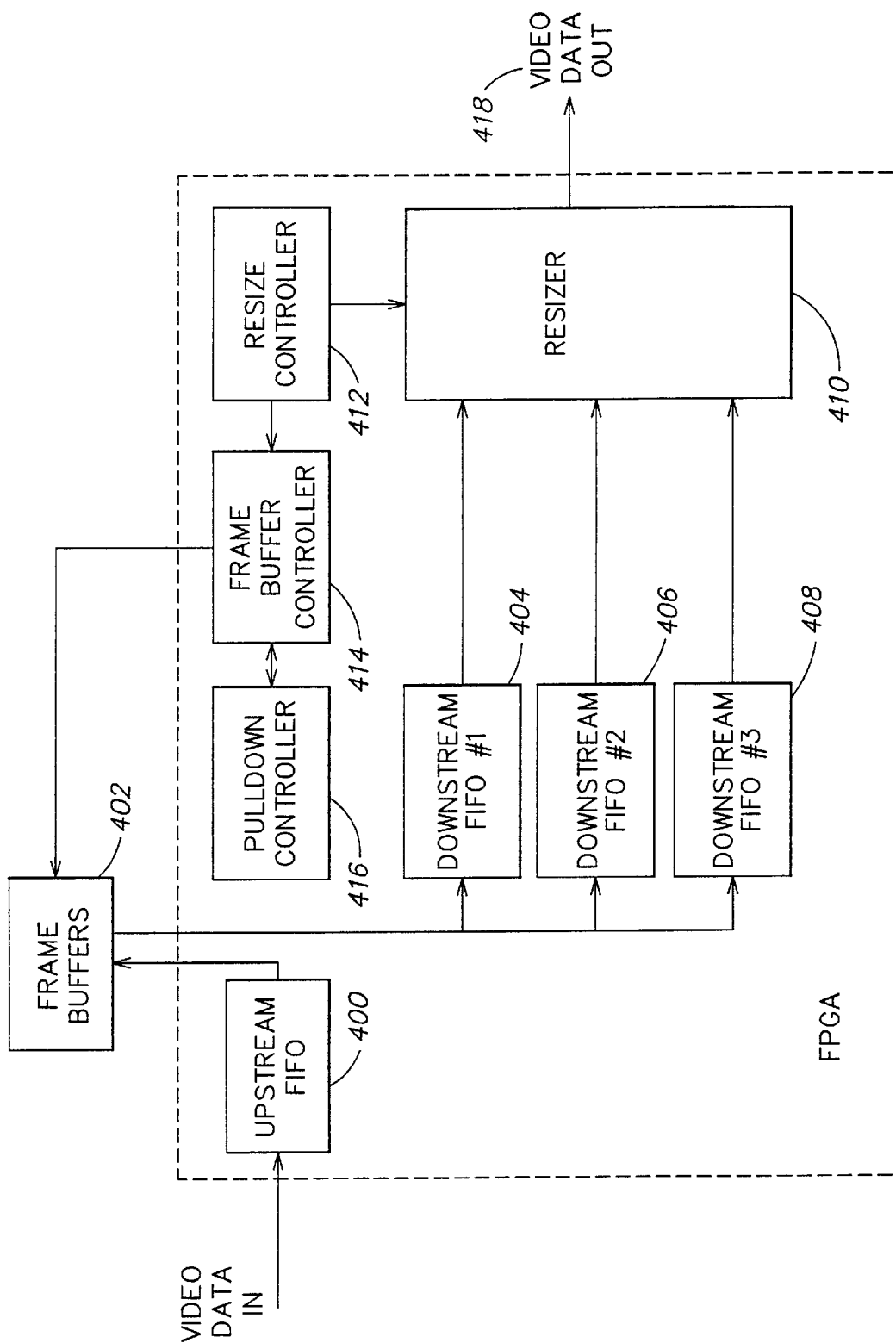
FIG. 4 is a block diagram of one embodiment of the system of FIG. 1.

The circuit shown in FIG. 4, may be used in combination with other video data processing circuits that output video data to be received by this circuit in a buffer 400. The buffer 400 may be implemented, for example, as a first-in first-out (FIFO) buffer. Data from the buffer 400 may be input to a frame buffer 402, which is described in more detail below. From the frame buffers 402, data for lines of an image may be read into two or more buffers 404, 406 and 408 for processing by a resizer 410. The number of buffers used at 404 to 408 may constrain the extent to which the input image may be resized vertically. The resizing operation performed by the resizer 410 and the data to be written into the buffers 404 through 408 are controlled by a resize controller 412. The resize controller 412 controls the resizer 410 and a frame buffer controller 414 so that the resizer receives data from the appropriate lines of the input image. The frame buffer controller also is responsive to a pulldown controller 416 which tracks the position of the output fields in a specified pulldown sequence in order to select an appropriate input image to provide to the resizer. The resizer 410 provides output fields as its video data out 418.

The frame buffer 402 may be implemented, for example, using a random access memory (such as an SRAM, SDRAM or DRAM). If the frame buffer may store at least three fields of image data, many known forms of pulldown sequences may be used, including 2:3 pulldown, 3:2 pulldown, conversion to PAL format from film, and other pulldown operations.

Figure 5:
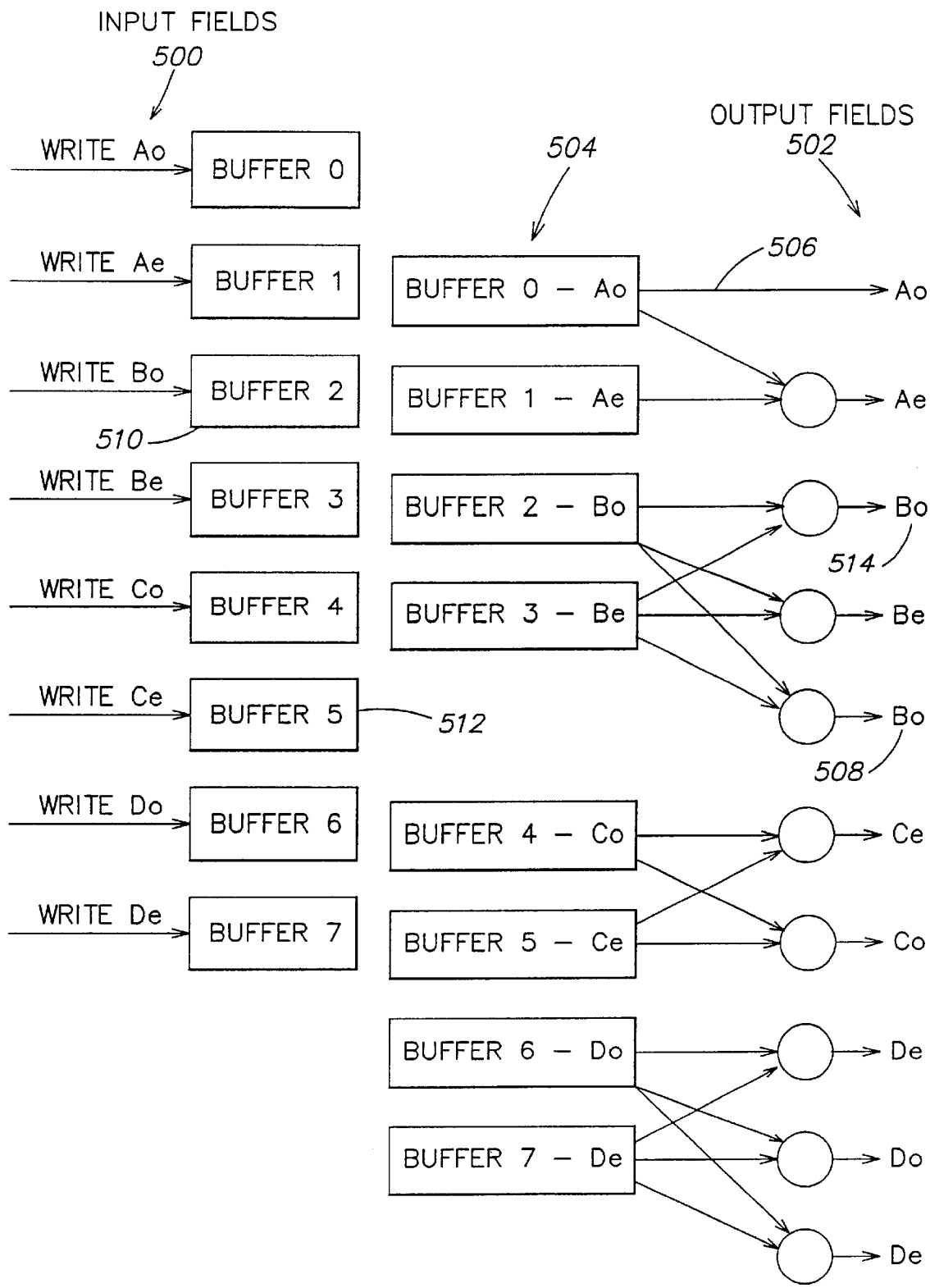
FIG. 5 is an illustration of the temporal relationship between input fields and output fields in the circuit of FIG. 4.

Referring now to FIG. 5, using the example of 2:3 pulldown, input fields (as shown at 500) are combined by the resizer to produce the output fields (as shown at 502) according to the pulldown sequence. Each input field in an eight field sequence is shown having its own buffer, as illustrated by buffers zero through seven. The contents of those buffers is used, as shown at 504, to create the output fields 502, as indicated by the arrows 506. Therefore, in order to create output field B odd, as indicated at 508, the input field B odd that is written into the buffer 510 is being used for the last time while the C even field is being written into a buffer 512. Therefore, buffering for at least three fields is available in the frame buffer 402 to handle the latency between the writing of an input field 500 to the frame buffer 402 and reading the data from the frame buffer to produce a corresponding output field.

It should be understood that in FIG. 5, the odd output field "B odd" 514 may be different from the odd output field "B odd" 508 because resize operations may be performed using different portions of the input image to produce the different output fields. It should be understood that the pan and scan or other resize operations may be specified at the temporal rate of the input fields, such as forty-eight fields per second or twenty-four frames per second, but are applied at the output rate to reduce artifacts similar to twitter and judder.

Figure 6:
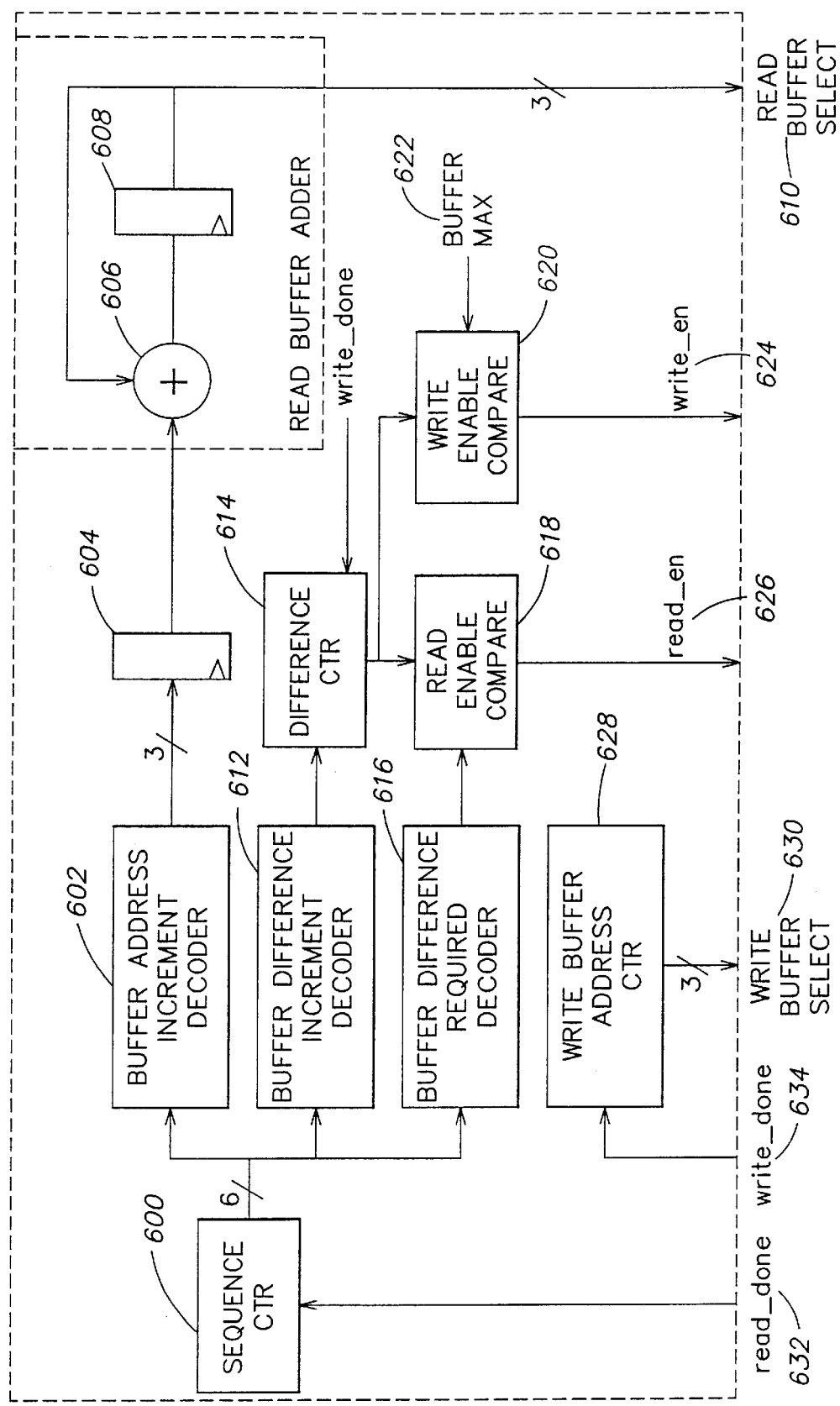
FIG. 6 is a block diagram of the pulldown controller in FIG. 4.

Referring now to FIG. 6, an example implementation of the pulldown controller 416 in FIG. 4 will now be described. A sequence counter 600 is loaded with a count value representing a pulldown sequence to be performed. It may count from zero to seven for no pulldown, zero to nine for pulldown from a typical film rate of twenty-four frames per second to an NTSC television signal, and zero to forty-nine for pulldown for a typical film rate to PAL. These counts are based on input data that is formatted as temporally coherent fields representative of a film frame, captured at a rate of twenty-four frames per second. Other pulldown sequences may be specified and the invention is not limited to any particular form of pulldown. To permit mixing of data formats in the input images, a pulldown enable signal may be provided to the pulldown controller to disable or enable pulldown as may be specified by a given composition to be played back. The sequence counter is decoded to select a buffer. Its initial value depends on the pulldown sequence, which may be loaded after each pulldown sequence is processed.

A buffer address increment decoder 602 decodes the sequence count from the sequence count 600 to generate an increment value, which is latched by latch 604 and applied to adder 606. The increment value generally is 1, 3 or −1 for 3:2 pulldown. A table for decoding the sequence count for film to NTSC pulldown to provide the increment value, the required difference and the signal indicating if the buffer difference counter should be decremented is the following:

| Sequence Counter | Increment Value | Required Difference | Difference Counter |
| --- | --- | --- | --- |
| 0000 | 001 | 1 | 0 |
| 0001 | 001 | 1 | 0 |
| 0010 | 001 | 0 | 0 |
| 0011 | 111 | 1 | 1 |
| 0100 | 011 | 1 | 0 |
| 0101 | 111 | 1 | 1 |
| 0110 | 011 | 1 | 0 |
| 0111 | 111 | 0 | 1 |
| 1000 | 001 | 1 | 0 |
| 1001 | 001 | 1 | 0 |
| others | 000 | 0 | 0 |

A table for decoding the sequence count for film to PAL pulldown to provide the increment value, the required difference and the signal indicating if the buffer difference counter should be decremented is the following:

| Sequence Counter | Increment Value | Required Difference | Difference Counter |
| --- | --- | --- | --- |
| . . . 010110 | . . . | 0 | 0 |
| 010111 | 111 | 1 | 0 |
| 011000 | 011 | 1 | 0 |
| 011001 | 111 | 1 | 1 |
| 011010 | 011 | 1 | 0 |
| 011011 | 111 | 1 | 1 |
| 011100 | 011 | 1 | 0 |
| 011101 | 111 | 1 | 1 |
| 011110 | 011 | 1 | 0 |
| 011111 | 111 | 1 | 1 |
| 100000 | 011 | 1 | 0 |
| 100001 | 111 | 1 | 1 |
| 100010 | 011 | 1 | 0 |
| 100011 | 111 | 1 | 1 |
| 100100 | 011 | 1 | 0 |
| 100101 | 111 | 1 | 1 |
| 100110 | 011 | 1 | 0 |
| 100111 | 111 | 1 | 1 |
| 101000 | 011 | 1 | 0 |
| 101001 | 111 | 1 | 1 |
| 101010 | 011 | 1 | 0 |
| 101011 | 111 | 1 | 1 |
| 101100 | 011 | 1 | 0 |
| 101101 | 111 | 1 | 1 |
| 101110 | 011 | 1 | 0 |
| 101111 | 111 | 0 | 1 |
| 110000 | 001 | 1 | 0 |
| 110001 | 001 | 1 | 0 |
| others | 001 | 1 | 0 |

The output of the read buffer adder 606 is latched by latch 608 to provide a read buffer select signal 610. This read buffer select signal indicates the current buffer from which data is read the current output field.

A buffer difference increment decoder 612 decodes the sequence count from the counter 600 to determine if the buffer difference counter 614 should be decremented. Without pulldown, the counter is decremented when a field is read and incremented when a field is written. The buffer difference counter 614 is decremented except when a field that is read is subsequently repeated. Decrementing the difference counter has the effect that the contents of one of the buffers in the frame buffer are invalidated, allowing data for a new field to overwrite that buffer. A buffer difference required decoder 616 also determines from the sequence counter 600 a required difference that is used to control buffer reads. The difference comparators 618 compares the output of the buffer difference counter 614 to the required difference from decoder 616. Buffer reads are enabled by the read enable signal 626 if the output of the difference counter 614 is greater than the required difference from decoder 616. The maximum number of buffers available 622 is compared to the output of the difference counter 614 by write enable comparator 620 to provide a write enable signal 624. If the output of the difference counter is less than the maximum number of buffers available, e.g., 3, writing is enabled.

A write buffer address counter 628 also is used to keep track of the current write buffer. This counter increments after every write to a buffer is completed. The write buffer select signal is an output from this counter.

The frame buffer controller 414 (described below) provides the read done signal 632 to the sequence counter after a field, or a selected area within the field, is read from the frame buffer. A write done signal 632 is provided to the write buffer address counter 628 after a field has been completely written to the frame buffer.

Figure 7:
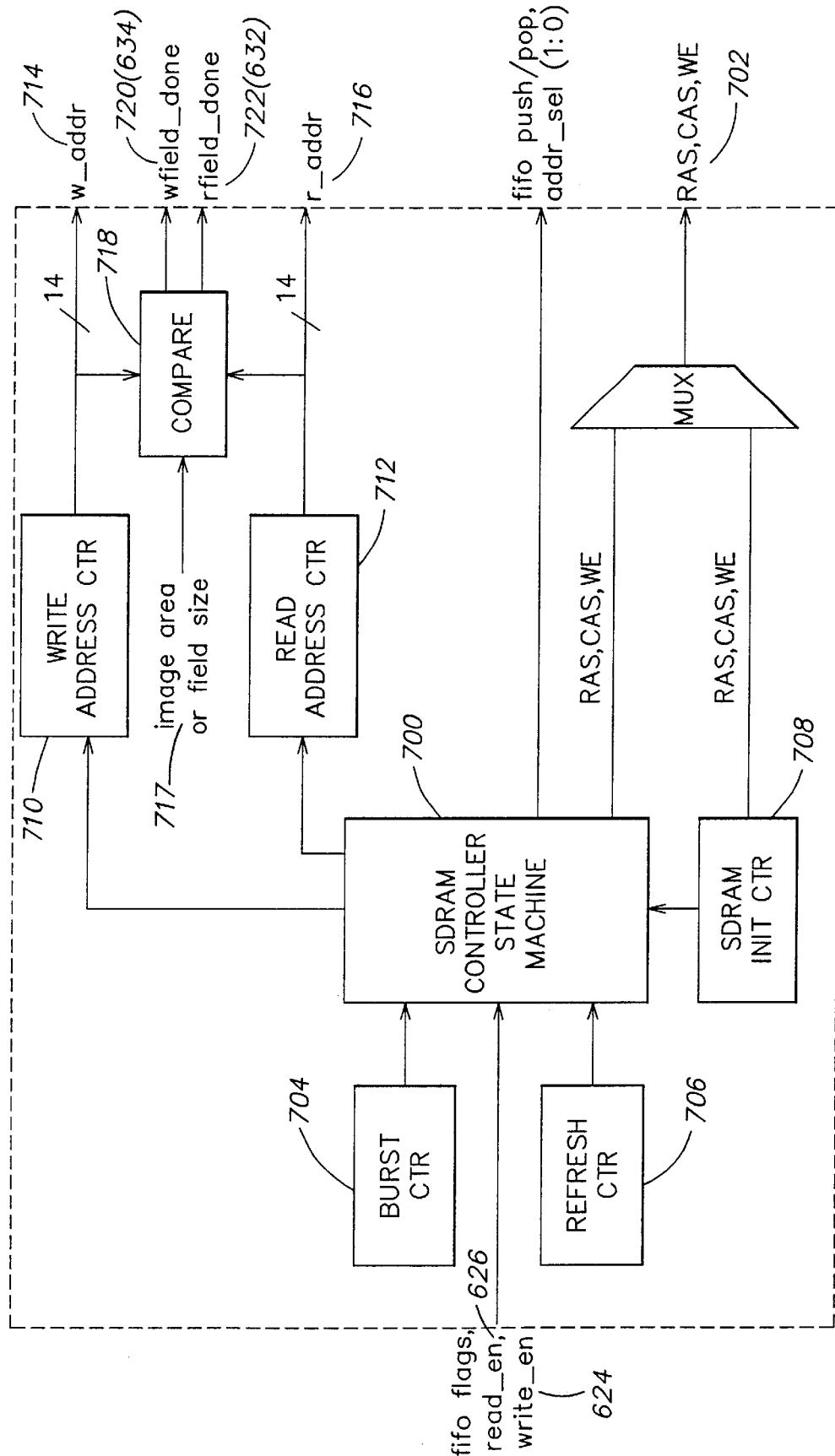
FIG. 7 is a block diagram of the frame buffer controller in FIG. 4.

The frame buffer controller 414 in FIG. 4 will now be described in connection with FIG. 7. A DRAM controller 700 generates refresh signals 702 to the frame buffer in response to a burst counter 704 and refresh counter 706 using standard techniques. An initialization sequencer 708, described below, may initialize the frame buffer and the controller 700. The controller also increments read and write address counters 710 and 712 in response to read enable and write enable signals 626 and 624 from the pulldown controller and FIFO flags from the input and output buffers. The FIFO flags indicate whether the input buffer has data available to be written or whether the output buffer has space available for data. The write address counter 710 generates interfield write addresses 714. The read address counter generates interfield read addresses 716. These addresses are applied to the address inputs of frame buffer. A comparator 718 compares the write address counter 710 to a specified field size 717 to provide status signal 720 indicating whether writing a field has been completed to the pulldown controller. The comparator 718 compares the read address counter to information defining the area within the input image that has been selected. This information, such as a position and a size or two positions specifying the area within the input image, is specified by the resize controller 412 according to the resize operation to be performed.

The initialization counter 708 may be used to cause a waiting period following a system reset before the DRAM controller 700 permits data to be written to or read from the frame buffer. For example, the period may be a hundred microseconds. The initialization counter 708 is set and is decremented by the refresh counter 706. After the wait time is met by the initialization counter 708, an initialization sequence is then started on the frame buffer memory by the controller 700. After the initialization sequence finishes, the controller 700 is enabled to process read, write and refresh requests.

Figure 8:
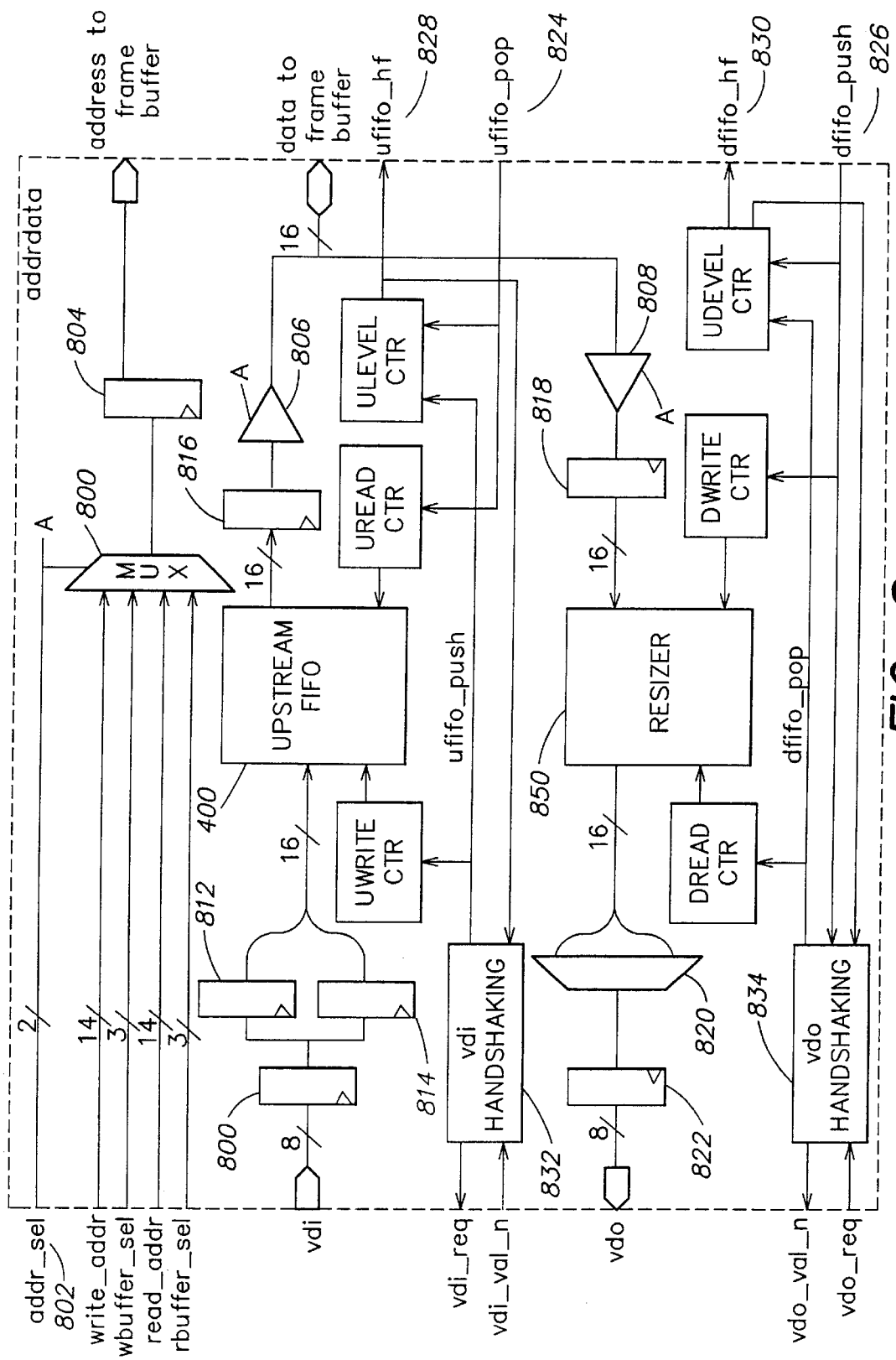
FIG. 8 is a diagram of the data flow control between the upstream FIFO, frame buffers and downstream FIFO in FIG. 4.

The control of addresses to and the control of data to and from the frame buffer, and the administration of the address and data bus according to the read and write operations being performed, will now be described in connection with FIG. 8. FIG. 8 shows an address multiplexer 800 into which the read address and write address, and read and write buffers select signals are input. According to an address selection signal 802, one of the write or read address and buffer selection signals are received by a latch 804 to provide an address to the frame buffer. The signal 802 is provided by the controller 700 shown in FIG. 7. The data to the frame buffer is input through an upstream FIFO 400. Data from a line of a field is received from the frame buffer by the resizer 850 which may include the buffers 404 through 408 of FIG. 4. Buffers 806 and 808 also are controlled by the address selection signal 802 according to whether data is being read from or written to the frame buffer.

In one embodiment, the data input to the upstream FIFO 400 is received in an 8-bit format, latches 810, 812 and 814 construct the data into 16-bit words for storing in the FIFO 400. The FIFO 400 outputs 16-bit words into a latch 816 to provide the data to the frame buffer. Conversely, a latch 818 receives 16-bit data from the frame buffer to be received by the resizer 850. Data output by the resizer 850 downstream FIFO is multiplexed by multiplexer 820 into 8-bit form in latch 822. The reading of data from the FIFO 400 and writing of data to the buffers in the input of the resizer 850 is provided by push and pop signals 824 and 826, which are provided by controller 700 (FIG. 7). The half full flags 828 and 830 also may be provided to the controller 700. The FIFO status flags permit the controller 700 to control the data flow into and out of the frame buffer to provide a smooth flow of data through the upstream FIFO and resizer.

Flow control handshaking also may be provided on both the input and outputs of the circuit as indicated at 832 and 834. Such flow control is described in general, for example, in U.S. patent application Ser. No. 09/054,920, filed Apr. 3, 1998, and entitled "Apparatus and Method for Controlling Transfer of Data Between and Processing of Data by Interconnected Data Processing Elements." The application of such flow control in the circuits shown in FIGS. 6 through 8 will now be described in more detail. Read and write requests to the frame buffer are controlled based on the FIFO flags 828 and 830 (FIG. 8) and the write enable and read enable signals from 624 and 626 from the pulldown circuit (FIG. 6). Controller 700 (FIG. 7) permits data to be written to the frame buffer if the upstream FIFO 400 is half full and the write enable signal is enabled. Read operations are initiated if the selected downstream FIFO in the resizer is not half full and the read enable signal is enabled. At the end of writing a field, a write done signal is asserted when the current field size is equal to the current write address counter in FIG. 7. When the end of a selected area of the input image is reached, i.e., when the current read address counter is at the last position of the selected area, a read done signal is asserted. These done signals are asserted until the start of the next write operation. When the done signal is asserted, the address counter is reset to zero. The done signals also are used to increment the write counter and the sequence counter in FIG. 6.

In FIG. 8, for the interfaces shown at 832 and 834, data is accepted by interface 832 if the data valid signal is asserted. The valid data signal is not asserted until the request signal is asserted. After the request signal is de-asserted, several valid bytes of data may be transferred. The request signal is based on the half full signal from the FIFO 400. For the interface 834, if the buffer 404 through 408 is not empty it issues a valid data signal if the request signal is asserted. If the request signal is de-asserted, several bytes of data, e.g. two, may be sent. A maximum number of bytes that may be sent after the request signal is de-asserted can be defined by convention.

Having now described how field data is written to a frame buffer and how data flows into and out of the frame buffer, the resizing operation will now be described.

Resizing of an image may use any techniques that are known in the art to expand or reduce an input image data into an output image of different size or aspect ratio. Instead of producing an entire output image, the lines of only the odd or even field may be produced, as specified by the interlace format or pulldown sequence, if any, for the sequence of output images.

In general, resizing may be performed in the horizontal direction and/or the vertical direction. The resizer receives an indication of the area within the input image to be resized, and the size of the output field, and the kind of image to be output (whether frame, odd field or even field). If the resizer has access to a randomly accessible frame buffer, any filter may be used to generate an output image because all of the pixel data is available from the frame buffer to be used. The area within an input image maybe specified at a subpixel resolution, such as $1/256$ of a pixel.

In general, the filter used for either horizontal or vertical filtering is positioned at the point at which the output pixel is to be generated. The output pixel is generated by multiplying filter coefficients with corresponding input pixels. In general, the sum of the filter coefficients should equal one to avoid amplification or attenuation of the input signal. If the output pixel does not exactly align with the lines and rows of input pixels, which occurs with subpixel positioning of the sampling area, new filter coefficients are calculated using the current fixed filter coefficients. These new coefficients may be generated by simple linear interpolation. In general, both horizontal and vertical resizing involves determining the ratio of input pixels to output pixels, a filter to be used, and how that filter should be positioned relative to the input grid to center the filter on the position of the output pixel, from which the output pixel may be generated.

In a system in which the input images are temporally coherent fields obtained from a scanned anamorphic film image, resizing operations may be optimized for images that have up to a 2.33:1 aspect ratio. If the output images have a 4:3 aspect ratio, such as television fields, the horizontal image expansion factor is 1.7475. The vertical image compression for letterboxing of such anamorphic images for display on a 4:3 video display uses a vertical image compression factor of 0.5722.

Figure 9:
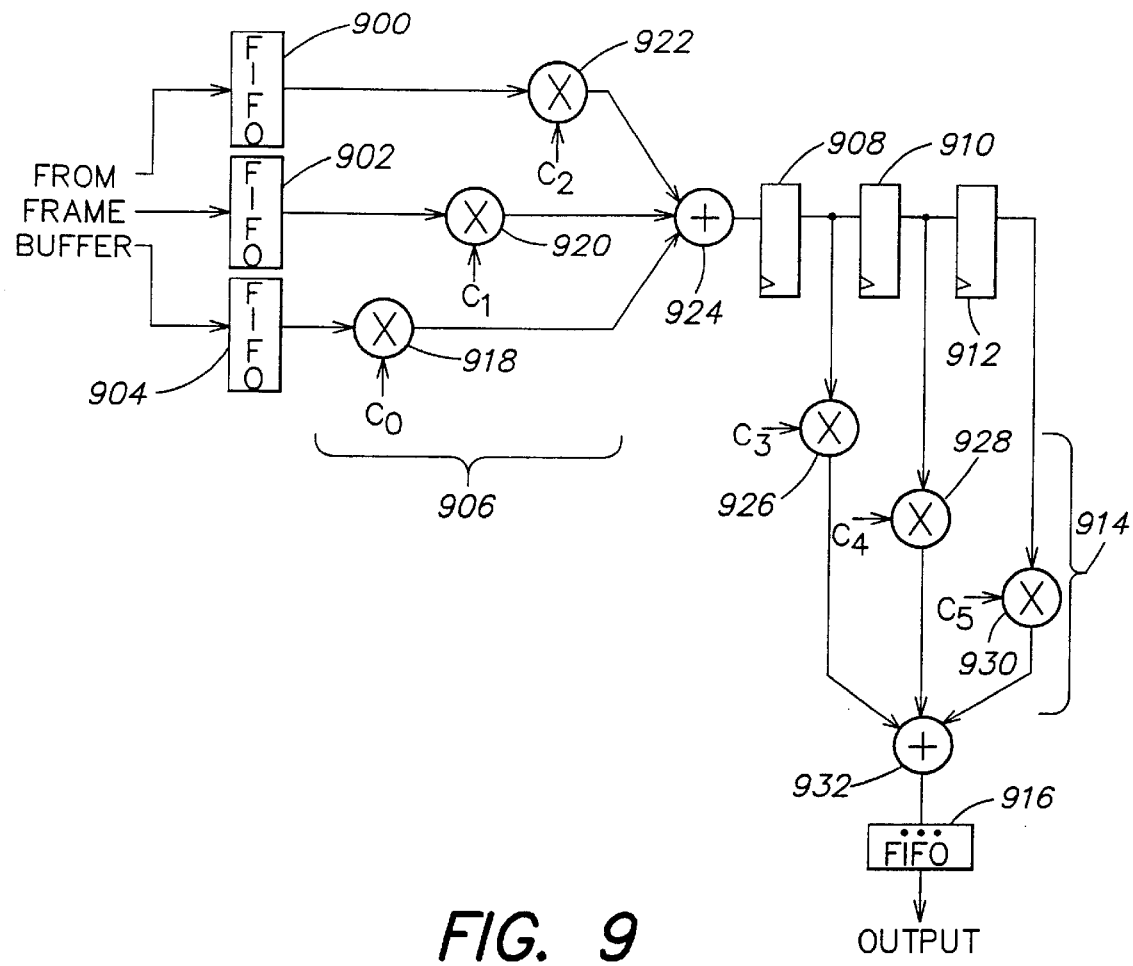
FIG. 9 is a block diagram of a resizer in one embodiment.

Referring now to FIG. 9, the downstream FIFOs in FIG. 4 define line segment buffers 900 through 904. The number of line segment buffers may affect the number of lines that may be used to perform vertical resizing. The contents of the line segment buffers are used by a vertical resizer 906 to produce an output pixel which is latched by latch 908. Two more latches 910 and 912 permit three pixels of data for a line to be stored and then combined by a horizontal resizer 914 to produce an output pixel for a line which is stored in FIFO 916. The output pixels that are output through FIFO 916 are provided at the spatial resolution specified for the output images.

The vertical and horizontal resizers may be implemented using any of many known techniques. In the circuits shown in FIG. 9, the vertical resizer is a three-tap filter. In particular, a pixel from buffer 900 is multiplied by a coefficient C2 by multiplier 922. A pixel from buffer 902 is multiplied by a coefficient C1 by multiplier 920. Similarly, a pixel from buffer 904 is multiplied by a coefficient C0 by multiplier 918. The outputs of multipliers 918, 920 and 922 are summed by adder 924 to produce an output pixel.

Similarly, the horizontal resizer 914 also may be a three-tap filter. A first pixel output by latch 908 is multiplied by coefficient C3 by multiplier 926. A second pixel output by latch 910 is multiplied by coefficient C4 by multiplier 928. A third pixel output by latch 912 is multiplied by coefficient C5 by multiplier 930. The outputs of multipliers 926, 928 and 930 are summed by adder 932 which outputs the output pixel to FIFO 916.

Figure 10:
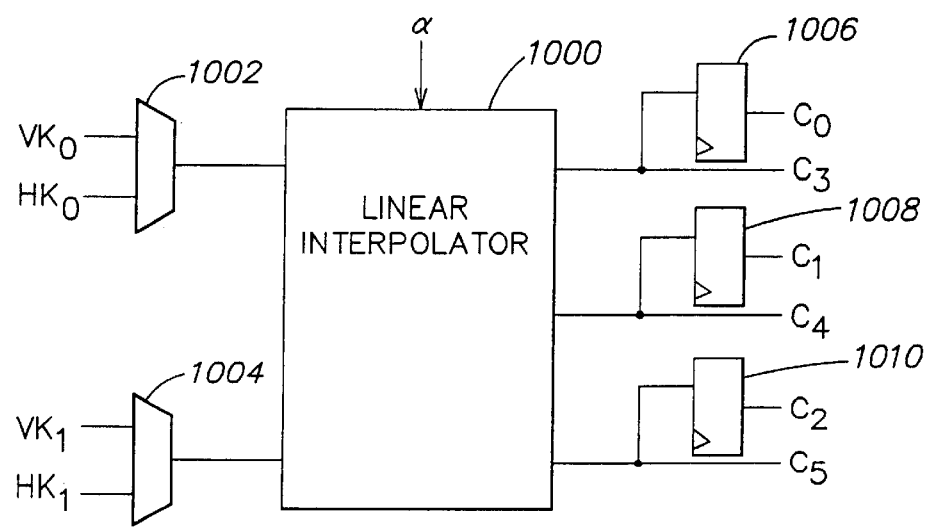
FIG. 10 is a block diagram of an interpolator for generating coefficients for the resize of FIG. 9.

How the coefficients for the vertical resizer and horizontal resizer in FIG. 9 are determined will now be described in connection with FIG. 10. A linear interpolator 1000 receives a pair of either vertical coefficients $VK_0$, $VK_1$, or horizontal coefficients $HK_0$, $HK_1$, through selectors 1002 and 1004. These two values represent two of four coefficients of a simple box filter. Any number of coefficients may be used, depending on the kind of filter used. In this example, all of the values $VK_0$, $VK_1$, $HK_0$, and $HK_1$ are equal to one-half and endpoints of the filter are assumed to be zero. The vertical coefficients are selected and used to generate coefficients C0, C1 and C2 at the start of each line of the output image by interpolating between the specified filter coefficients. The horizontal coefficients are selected and used by the interpolator 1000 to generate coefficients C3, C4 and C5 for each output pixel by interpolating between the specified filter coefficients.

Interpolator 1000 performs a linear interpolation using the two selected coefficients according to a value $\alpha$ as indicated at 1008. The value a represents the offset of the output pixel or output line from a grid defined by the lines and rows of pixels of the input image. An equation that describes generally the function of the interpolator 1000, permitting the coefficient pairs $VK_0$ and $VK_1$ and $HK_0$ and $HK_1$ to be different and assuming the endpoint are zero, are the following:

$$VC_0 = 0 + (1-\alpha)*(VK_0-0) = C_0$$

$$VC_1 = VK_0 + (1-\alpha)*(VK_1-VK_0) = C_1$$

$$VC_2 = VK_1 + (1-\alpha)*(0-VK_1) = C_2$$

$$HC_0 = 0 + (1-\alpha)*(HK_0-0) = C_3$$

$$HC_1 = HK_0 + (1-\alpha)*(HK_1-HK_0) = C_4$$

$$HC_2 = HK_1 + (1-\alpha)*(0-HK_1) = C_5$$

In general $$C_n = K_{n-1} + (1-\alpha)*(K_n - K_{n-1}).$$

A computer system for implementing the system of FIG. 1 as a computer program may include a main unit connected to both an output device which displays information to a user and an input device which receives input from a user. The main unit may include a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD) and other video output devices, printers, communication devices such as a modem, storage devices such as disk or tape. and audio output. It should also be understood that one or more input devices may be connected to the computer system. Example input devices include a keyboard, keypad, track ball, mouse, pen and tablet, communication device, and data input devices such as audio and video capture devices. It should be understood that the invention is not limited to the particular input or output devices used in combination with the computer system or to those described herein.

The computer system may be a general purpose computer system which is programmable using a computer programming language, such as "C++," JAVA or other language, such as a scripting language or even assembly language. An example computer system is the Infinite Reality computer system from Silicon Graphics, Inc. The computer system may also be specially programmed, special purpose hardware, such as an application specific integrated circuit (ASIC). In a general purpose computer system, the processor is typically a commercially available processor, of which the series x86 and Pentium series processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which WindowsNT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An apparatus for resizing and converting frame rate of a sequence of images, comprising:

a buffer for receiving pixel data of a sequence of input images having a first temporal resolution, wherein the buffer stores both odd and even lines of at least one of the input images, wherein the odd and even lines are temporally coherent; and a resizer for resizing each of the received input images to produce an output image using both odd and even lines from the input image, and for accessing the buffer to perform resizing operations having parameters defined at a second temporal resolution different from the first resolution, wherein the resizer has an output for providing a sequence of the output images at the second temporal resolution;

wherein the parameters include a kind of field to be output according to a pulldown sequence and an area in the input image from which both odd and even lines of the input image are sampled to create the output image.

2. The apparatus of claim 1, wherein a position of the area within the input image varies over time.

3. A method for resizing and converting frame rate of a sequence of images, comprising:

receiving pixel data of a sequence of input images having a first temporal resolution into a buffer, wherein the buffer stores both odd and even lines of at least one of the input images, wherein the odd and even lines are temporally coherent;

resizing each of the received input images to produce an output image using both odd and even lines from the input image by accessing the buffer to perform resizing operations having parameters defined at a second temporal resolution different from the first resolution to provide a sequence of the output images at the second temporal resolution, wherein the parameters include a kind of field to be output according to a pulldown sequence and an area in the input image from which both odd and even lines of the input image are sampled to create the output image.

4. The method of claim 3, wherein a position of the area within the input image varies over time.

5. A computer program product for resizing and converting frame rate of a sequence of images, comprising:

a computer readable medium;

computer program instructions stored on the computer readable medium such that, when executed by a processor, perform a method comprising:

receiving pixel data of a sequence of input images having a first temporal resolution into a buffer, wherein the buffer stores both odd and even lines of at least one of the input images, wherein the odd and even lines are temporally coherent;

resizing each of the received input images to produce an output image using both odd and even lines from the input image by accessing the buffer to perform resizing operations having parameters defined at a second temporal resolution different from the first resolution to provide a sequence of the output images at the second temporal resolution, wherein the parameters include a kind of field to be output according to a pulldown sequence and an area in the input image from which both odd and even lines of the input image are sampled to create the output image.

6. The computer program product of claim 5, wherein a position of the area within the input image varies over time.

7. An apparatus for resizing and converting frame rate of a sequence of images, comprising:

a buffer for receiving pixel data of a sequence of input images having a first temporal resolution, wherein the buffer stores both odd and even lines of at least one of the input images, wherein the inputs images are progressive; and a resizer for resizing each of the received input images to produce an output image using both odd and even lines from the input image, and for accessing the buffer to perform resizing operations having parameters defined at a second temporal resolution different from the first resolution, wherein the resizer has an output for providing a sequence of the output images at the second temporal resolution;

wherein the parameters include a kind of field to be output according to a pulldown sequence and an area in the input image from which both odd and even lines of the input image are sampled to create the output image.

8. A method for resizing and converting frame rate of a sequence of images, comprising:

receiving pixel data of a sequence of input images having a first temporal resolution into a buffer, wherein the buffer stores both odd and even lines of at least one of the input images, wherein the input images are progressive;

resizing each of the received input images to produce an output image using both odd and even lines from the input image by accessing the buffer to perform resizing operations having parameters defined at a second temporal resolution different from the first resolution to provide a sequence of the output images at the second temporal resolution, wherein the parameters include a kind of field to be output according to a pulldown sequence and an area in the input image from which both odd and even lines of the input image are sampled to create the output image.

9. A computer program product for resizing and converting frame rate of a sequence of images, comprising:

a computer readable medium;

computer program instructions stored on the computer readable medium such that, when executed by a processor, perform a method comprising:

receiving pixel data of a sequence of input images having a first temporal resolution into a buffer, wherein the buffer stores both odd and even lines of at least one of the input images, wherein the input images are progressive;

resizing each of the received input images to produce an output image using both odd and even lines from the input image by accessing the buffer to perform resizing operations having parameters defined at a second temporal resolution different from the first resolution to provide a sequence of the output images at the second temporal resolution, wherein the parameters include a kind of field to be output according to a pulldown sequence and an area in the input image from which both odd and even lines of the input image are sampled to create the output image.

\* \* \* \* \*